April 20, 1943.  R. F. BLANKS  2,317,093
MATERIALS TESTING EQUIPMENT
Filed Oct. 11, 1932
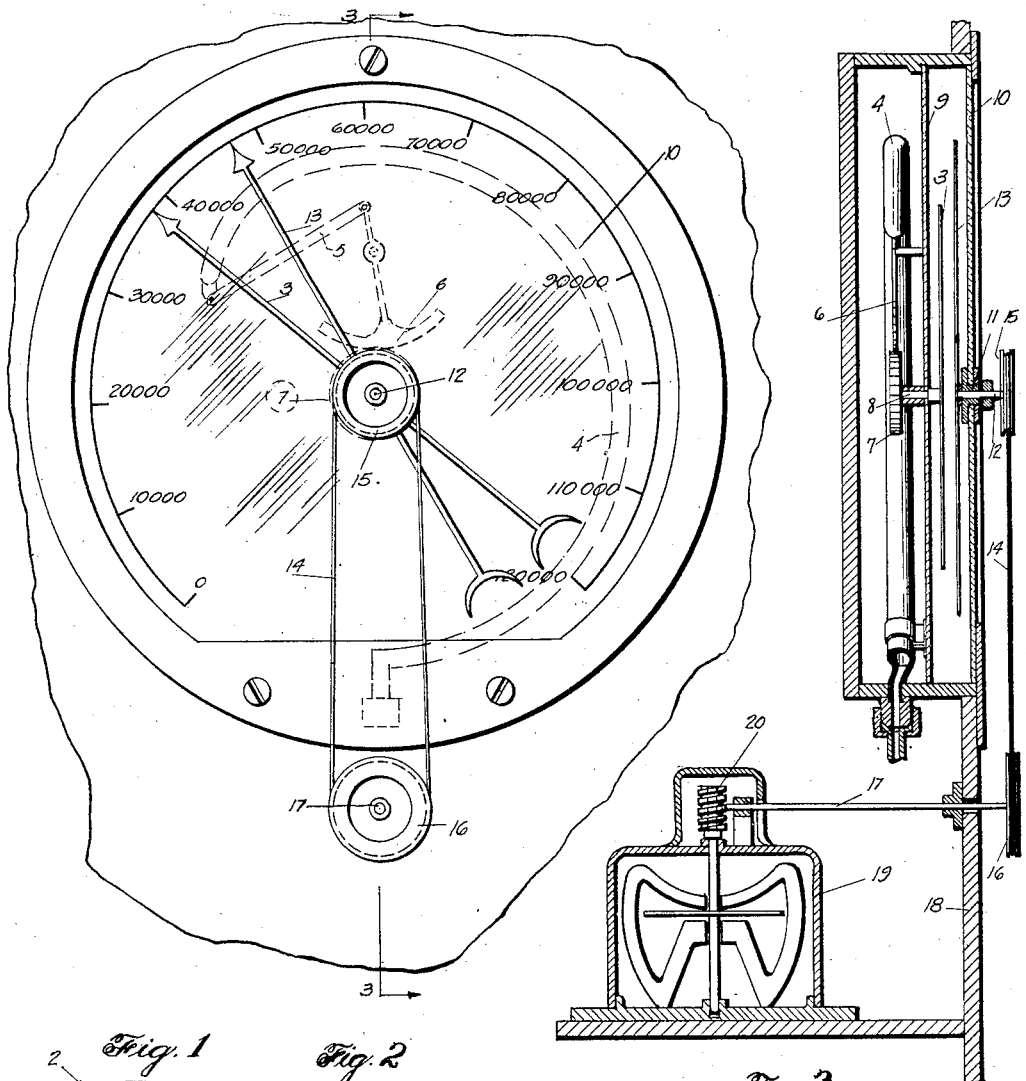
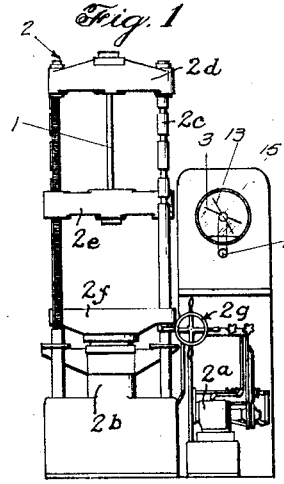
Fig. 1
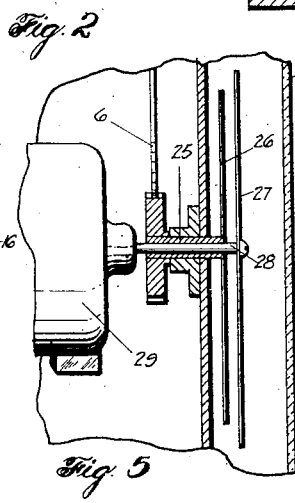
Fig. 2  Fig. 5
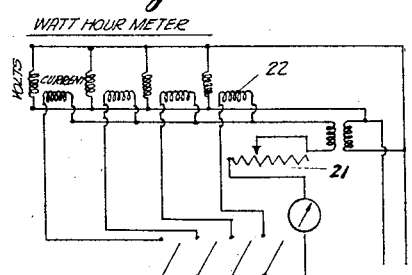
Fig. 4
INVENTOR
R. F. BLANKS Patented Apr. 20, 1943

2,317,093

UNITED STATES PATENT OFFICE 2,317,093

MATERIALS TESTING EQUIPMENT

Robert F. Blanks, Denver, Colo., assignor, by mesne assignments, to Baldwin Locomotive Works, a corporation of Pennsylvania Application October 11, 1932, Serial No. 637,298

8 Claims. (Cl. 265—12)

This invention relates generally to materials testing apparatus and more particularly to an improved method and apparatus for assisting in applying a predetermined rate of load change to a specimen being tested whether under compression, tension or other forms of stress or strain.

In studying stress and strain characteristics of materials it has heretofore been attempted in certain classes of tests to apply a load to the specimen at a constant rate as by having the operator listen to a metronome and then manipulating the testing machine controls in an attempt to have the stress indicating hand move in timed relation to the beats of the metronome. This obviously requires an appreciable degree of skill on the part of the operator principally because of the isolated relation between the stress hand and timing instrumentality with consequent lack of physical coordination therebetween thus requiring the operator to attempt to coordinate his sense of sight of the indicating hand with his sense of hearing of the metronome.

In my improved method and apparatus it is possible to obtain not only a predetermined rate of loading preferably at a constant rate but to do so with the utmost ease by two instrumentalities which are so mechanically related and coordinated that an operator may easily follow the rate of loading at any given instant and thus allow him to concentrate more easily upon the manipulation of the testing machine controls so as to insure maintenance of the predetermined rate of loading.

It is one object of my invention to accomplish the foregoing advantages and results by providing two instrumentalities having preferably similar paths of motion and placed in such cooperating relation that there is immediately available a direct visible comparison between the same whereby when one is driven at a predetermined rate the other can be made to follow the same by adjustment of the testing machine controls. A more specific object is to provide a stress indicating hand rotatable over a suitable dial or scale and to provide an auxiliary load-rate hand rotatable about the same axis of the stress indicating hand, these hands thus being in superimposed relation in an axial direction, which would not necessarily be coaxial, whereby when the auxiliary hand has a constant or some predetermined rate of rotation the operator may instantly see whether the stress hand is travelling at the same rate as the auxiliary hand. If the two hands travel together then it is known that the load is being applied to the specimen at the desired rate as governed by the auxiliary hand. If the stress hand should tend to lead or lag the auxiliary hand, the operator may immediately adjust the testing machine controls so as to bring the stress hand into synchronism with the auxiliary hand which is also herein referred to as the load rate hand, thus accomplishing the desired rate of loading which is especially important in the testing of certain more or less non-elastic materials such as lead, etc.

A further and more specific object is to provide an improved rate of loading device which is particularly applicable to hydraulic testing machines thus enabling the use of an expansible pressure tube for actuating the stress indicating hand although in certain mechanical types of testing machines using a counterpoise of translatory motion for indicating the applied stress my invention may be used in principle by providing a load rate member having a similar path of movement to that of the counterpoise and preferably parallel thereto in superimposed or closely adjacent relation. It will also be observed from the disclosure herein that my invention is applicable not only to applying of loads and stresses but also to effecting given rates of strain as by having the indicating hand actuated in accordance with strain.

Other objects and advantages will be more apparent to those skilled in the art from the following description of the accompanying drawing in which:

Fig. 1 is a diagrammatic view of a testing machine in which a test specimen is placed;

Fig. 2 is a front elevation of a stress indicating dial and hand with my improved load rate mechanism applied thereto;

Fig. 3 is a vertical transverse section taken on line 3—3 of Fig. 2;

Fig. 4 is a wiring diagram of one form of load rate motor; and

Fig. 5 is a fragmentary transverse section of a modified form of stress indicating and load rate mechanism.

In the illustrated embodiment of my invention I have shown a specimen generally indicated at 1 supported for a tension test in a hydraulically actuated testing machine generally indicated at 2, although it will be understood that this is only a diagrammatic illustration and that a specimen may be subjected to compression or other kinds of tests in any suitable testing machine wherein the applied stress or other test condition is indicated in a suitable manner, preferably by a rotatable stress indicating hand 3. Hydraulically operated testing machines, such as are well known in the art and one common example of which is shown in Emery Patent 1,848,468, include a usual hydraulic pressure pump 2a for supplying pressure fluid to a testing machine loading cylinder 2b thereby moving a usual ram upwardly therein. This ram carries a loading frame having side rods 2c and a crosshead 2d. The upper end of a tension specimen is securely engaged by the movable crosshead 2d while the lower end of the specimen is securely engaged by a lower crosshead 2e formed as part of a sensitive weighing frame. To perform a compression test, a specimen is disposed between and engaged by the crosshead 2e and by a movable platform 2f formed respectively as part of a sensitive weighing frame and of a ram. The rate of applying load to a specimen through crosshead 2d or platform 2f is controlled by manually adjusting the rate of fluid flow from pump 2a to the testing machine loading cylinder 2b. A valve control for this purpose is well known and is generally indicated at 2g. In the specific embodiment of the instrument herein shown the hand is actuated by fluid pressure received in a curved expansible metal tube 4 connected to the pressure diaphragm chamber of a hydraulic type of testing machine, the outer free end of the tube being connected by a link 5 to a pivotally mounted rack 6 which actuates a pinion 7 secured to a shaft 8 of the pointer hand 3. This hand is thus rotated over the face of a graduated dial 9 in clockwise direction during increasing loads, the operating expansible tube mechanism being disposed behind dial 9.

A removable front glass 10 is provided with an opening preferably coaxial to shaft 8 so as to receive a suitable flanged bearing 11 journalling a shaft 12 which carries a hand 13 on the inside of glass 10. Hand 13 is driven at a constant speed or speeds, or any other predetermined variable speed if desired, by a belt 14 connecting a pulley 15 secured to shaft 12 with a pulley 16 driven by a shaft 17 projecting through an instrument panel 18 from the rear thereof. Any suitable motive power may be employed for actuating shaft 17 but in the event a constant speed is desired a watthour meter 19 may be suitably geared to shaft 17 as by a worm and gear generally indicated at 20. Should it be desired to vary the speed of the motor a variable resistance 21 may be suitably adjusted or should it be desired to obtain a wider range of speeds than possible with the rheostat then one or more of the windings 22 of the motor may be changed or omitted.

As a result of the foregoing arrangement it is seen that, if desired, a constant rate of rotation may be imparted to auxiliary hand 13 which herein is also referred to in its functional aspect as the load rate hand. To insure that a uniform rate of loading is applied to specimen 1 the operator can by merely glancing at the relatively superimposed stress indicating hand 3 and load rate hand 13, determine whether the load is being applied at the same rate as is indicated by hand 13. In the event that the load is not being applied fast enough hand 3 will lag behind hand 13 whereby the operator may adjust the testing machine controls and vice versa in case the load is being applied too fast in which case hand 3 will tend to lead hand 13, the ideal position of hand 3 being in register with hand 13, specifically immediately below hand 13 at all times during application of the load.

It will be noted that the predetermined rate of loading is accomplished irrespective of the deformation or strain characteristics of the material under test, thus obtaining results which are highly desirable especially in certain classes of non-ductile material.

When the test is completed and the pressure in tube 4 relieved, stress hand 3 will return counterclockwise to the zero reading but should it be desired at any time to adjust the position of load rate hand 13 the operator may grasp pulley 15 with his hand or fingers and rotate the pulley against the friction of belt 14 although it is clear that instead of having a belt driven hand it may be operated by a positive direct drive from the motor as described in connection with Fig. 5.

It is thus seen that I have provided a relatively simple arrangement for accomplishing a very desirable result which heretofore could be accomplished only by requiring an appreciable degree of skill on the part of the operator in coordinating his senses of hearing and sight, such as is the case where the metronome is used. It is further possible in my improved arrangement to apply the same to any existing testing machine equipment wherein the stress and load rate hands could have similar paths of movement and be disposed in closely adjacent or preferably in superimposed relation thus allowing one indicating member to tend to overlie the other member to render it more easy to determine the exactness with which the application of the load is following a given rate. This general arrangement is specifically shown herein, in one aspect of the invention, in that the two hands by both being rotatable have similar paths of movements and are in superimposed relation for direct common visible comparison at one glance of the eye.

In Fig. 5 there is shown a fragmentary transverse section of a modification of the indicating mechanism including a hollow shaft 25 for rotatably supporting a stress indicating hand 26 while the auxiliary load rate hand 27 is rotatably supported by a shaft 28 extending through hollow shaft 25 and actuated by any suitable motor 29 adapted to be driven at different constant speeds or at a variable speed by any suitable mechanism such for example as that shown in the watthour type of motor 19. From this disclosure it is seen that the load rate hand is direct connected to the driving motor so that to manually adjust or reset the auxiliary hand, the rear end of the motor shaft may be directly manually rotated when its current is shut off.

It will of course be understood that various changes may be made in the construction and arrangement of parts and details of design without departing from the spirit of the invention as set forth in the appended claims.

I claim:

1. An apparatus for determining a predetermined rate of load change applied to a test specimen in a materials testing machine comprising, in combination, a plurality of indicating members adapted to have similar paths of movement in relatively close relation for purposes of common visible comparison, means for driving one of said indicating members at a predetermined rate of speed, and means whereby the other member is adapted to be driven in response to the test load, whereby the relative positions of said members may be used to determine the rate of applying load to the specimen.

2. The combination set forth in claim 1 further characterized in that said indicating member which is driven at a predetermined rate of speed has provision whereby it may be manually reset.

3. The combination set forth in claim 1 further characterized in that supporting means are provided for said indicating members whereby they may move in alignment with each other.

4. An apparatus for determining a predetermined rate of load change applied to a test specimen in a materials testing machine comprising, in combination, a stress indicating hand, an auxiliary hand, means for rotatably supporting said hands in superimposed axial relation, means for driving said auxiliary hand at a predetermined rate of speed, and means whereby the other hand is adapted to be driven in response to the test load, whereby the relative positions of said hands may be used to determine the rate of applying load to the specimen.

5. The combination set forth in claim 4 further characterized in that the driving means for the auxiliary hand has provision for driving the same at different constant rates of speeds.

6. An apparatus for determining a predetermined rate of load change applied to a test specimen in a materials testing machine comprising, in combination, a dial face, a hand rotatable thereover, means for actuating said hand in accordance with a condition of a test specimen, an auxiliary hand having a rotatable support disposed forwardly of said dial face, and means for driving said auxiliary hand at a predetermined rate of speed.

7. In a pressure gauge for use in progressively applying fluid pressure at a desired time rate, a dial, a rotatable fluid pressure indicating hand mounted on a shaft and movable over said dial, operating mechanism for moving said hand in response to pressure changes in a line leading to said pressure gauge, an auxiliary hand rotatable about the same axis as said pressure indicating hand and movable over said dial, and means independent of the operating mechanism of the pressure indicating hand for driving said auxiliary hand at a constant speed at which it is desired to apply fluid pressure, whereby when said pressure indicating hand and said auxiliary hand are in alignment with each other the pressure is then being applied as desired.

8. The combination in an apparatus for effecting a predetermined rate of load change applied to a test specimen in a materials testing machine having opposed specimen-engaging elements one of which is moved to apply load to the specimen; comprising, a rate of load member movable at the precise predetermined rate of speed at which it is desired to apply load progressively to a specimen at each instant during a test irrespective of deformation characteristics of the specimen, means for continuously driving said member at said speed, a load indicating member movable in accordance with the actual load applied to the specimen and movable adjacent to said rate of load member in visible register therewith so long as load is actually applied to the specimen at said predetermined rate, means for actuating said load indicating member solely in accordance with the load force applied to the specimen, and adjustable means for controlling the application of load to the movable specimen engaging element of the testing machine whereby the operator may control the application of load force to the specimen and simultaneously observe whether said registered relation is being maintained.

R. F. BLANKS.